US00RE39565E

(19) United States
(12) Reissued Patent
Humphrey

(10) Patent Number: US RE39,565 E
(45) Date of Reissued Patent: Apr. 17, 2007

(54) FREESTANDING PORTABLE LAMP DISPLAY PACKAGE

(75) Inventor: Neall W. Humphrey, Reno, NV (US)

(73) Assignee: Trade Source International, Coppell, TX (US)

(21) Appl. No.: 10/857,800

(22) Filed: May 28, 2004

Related U.S. Patent Documents

Reissue of:
(64) Patent No.: 6,419,085
Issued: Jul. 16, 2002
Appl. No.: 09/973,286
Filed: Oct. 5, 2001

U.S. Applications:
(

(62) Division of application No. 09/814,906, filed on Mar. 22, 2001, now Pat. No. 6,325,209.

(51) Int. Cl.
*B65D 85/00* (2006.01)

(52) U.S. Cl. ..... 206/320; 206/779
(58) Field of Classification Search ..... 206/320, 206/326, 461, 470, 471, 573, 576, 736, 735, 206/775, 776, 779
See application file for complete search history.

(56) References Cited

U.S. PATENT DOCUMENTS 3,064,402 A * 11/1962 Crane, Jr.
3,158,261 A * 11/1964 Stiffel ..... 206/320
3,198,321 A * 8/1965 Politano ..... 206/573
4,099,612 A * 7/1978 Hanson ..... 206/45.19
4,257,211 A * 3/1981 Fales et al. ..... 53/442
4,415,084 A * 11/1983 Hauser ..... 206/461
D309,262 S * 7/1990 Coiner ..... D9/418
5,002,187 A * 3/1991 Rysner ..... 206/461
D321,323 S * 11/1991 Nakamura ..... D9/415
5,890,593 A * 4/1999 Humphrey ..... 206/471
5,947,291 A * 9/1999 Humphrey ..... 206/463
6,325,209 B1 * 12/2001 Humphrey ..... 206/320
2002/0125163 A1 * 9/2002 Chou ..... 206/418

* cited by examiner

*Primary Examiner*—David T. Fidei
(74) *Attorney, Agent, or Firm*—Munsch Hardt Kopf & Harr, P.C

(57) ABSTRACT

A freestanding portable lamp package for product display that can be placed on a store shelf or the like. The package is freestanding and protects the product contained therein from damage during shipment and display and prevents the need for an individual to remove the product from such packaging and disturb the contents within, while displaying the product to the public. The package utilizes a minimum of packaging materials. The package features a handle on the back side to make it easy for the customer to carry the product and package.

24 Claims, 15 Drawing Sheets

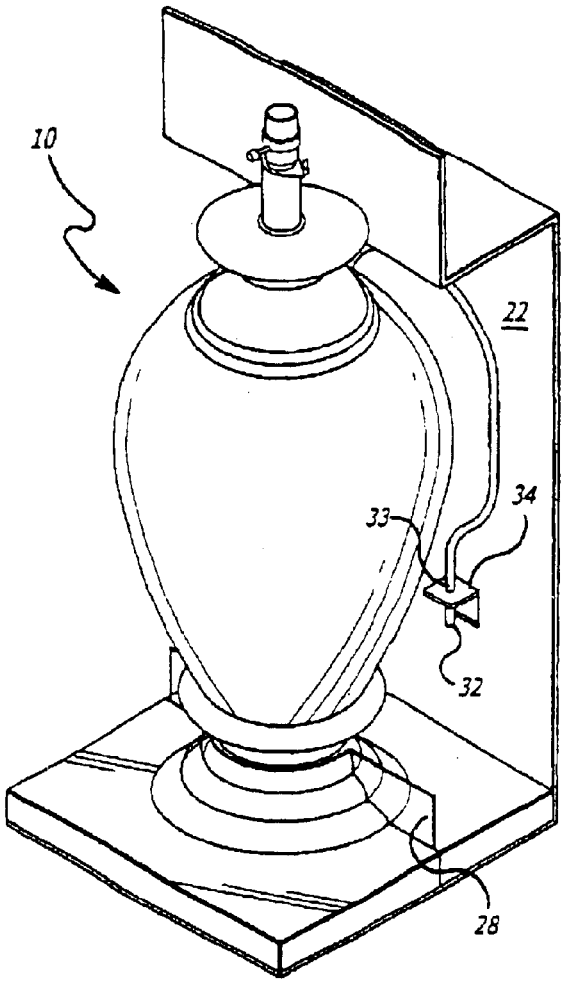
FIG. 4
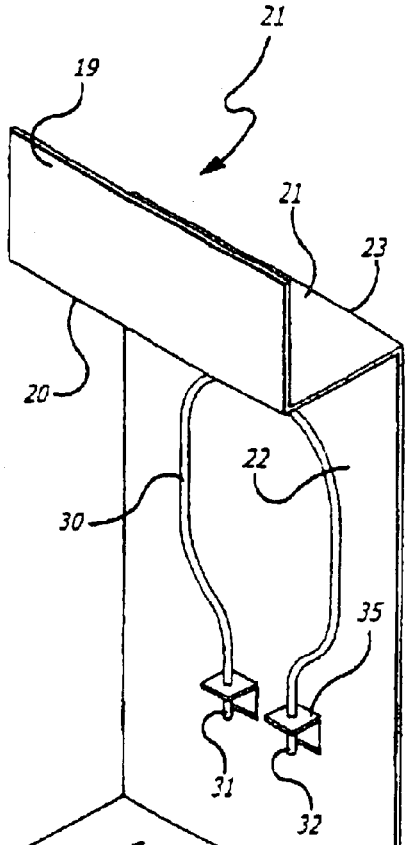
FIG. 2
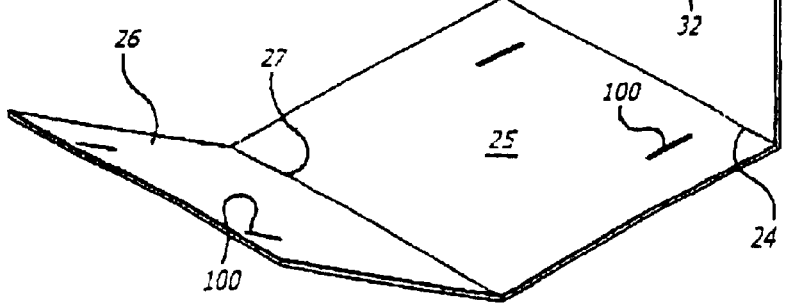

500
104
106
105
12

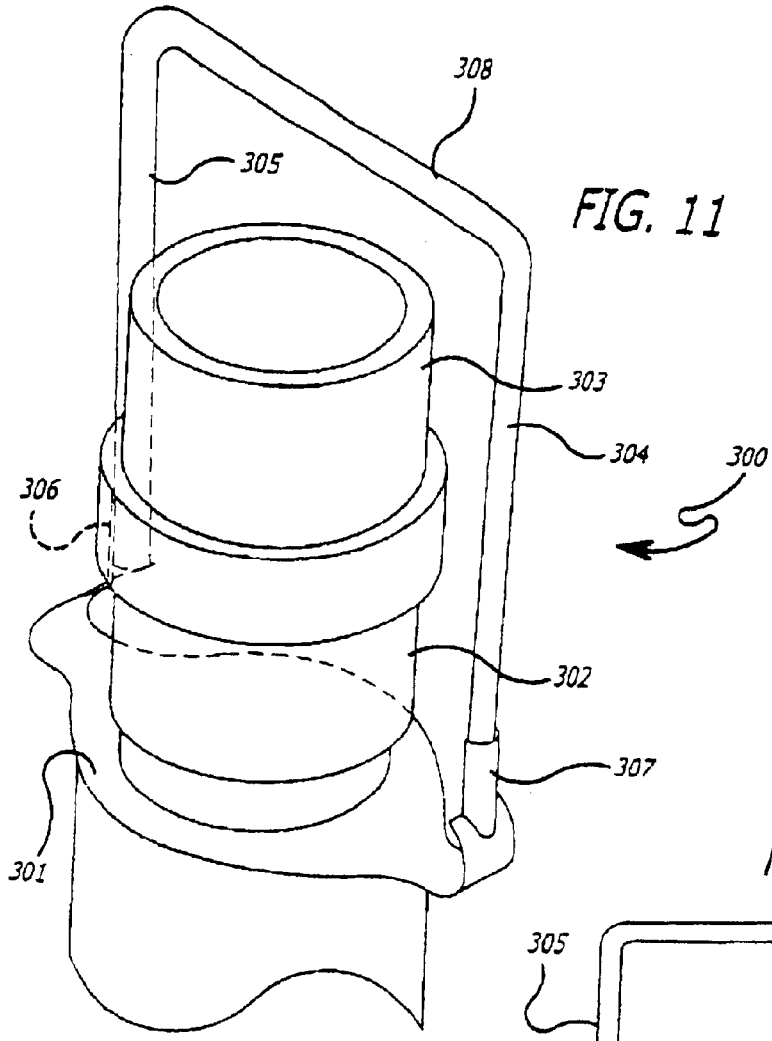
FIG. 11
FIG. 12
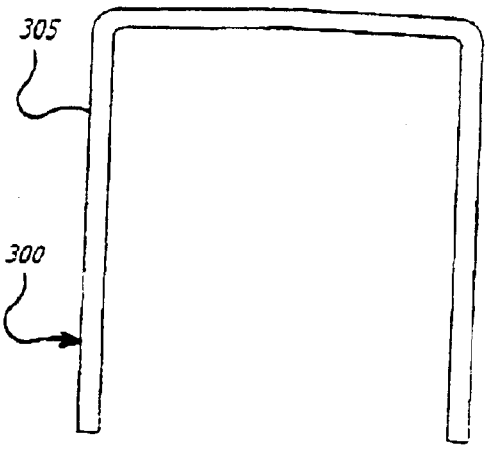
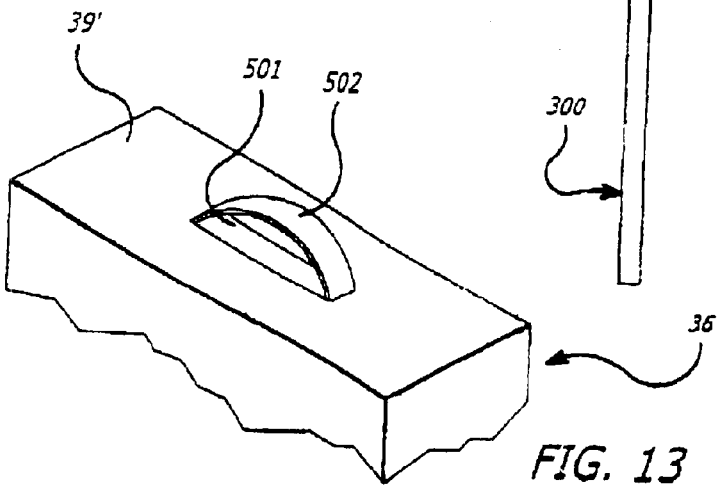
FIG. 13

FIG. 22
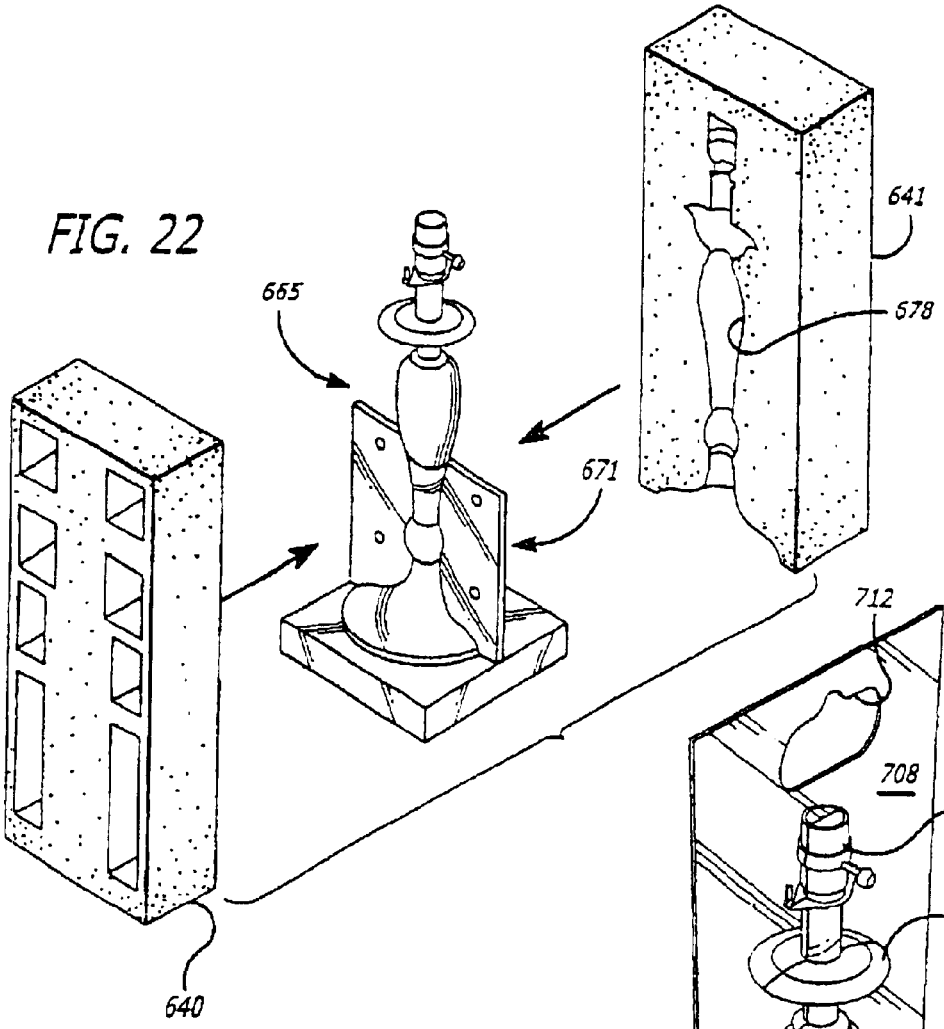
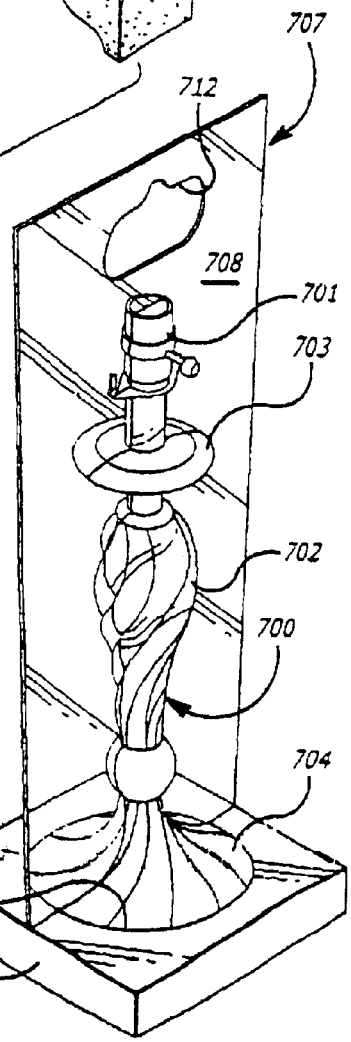
FIG. 23

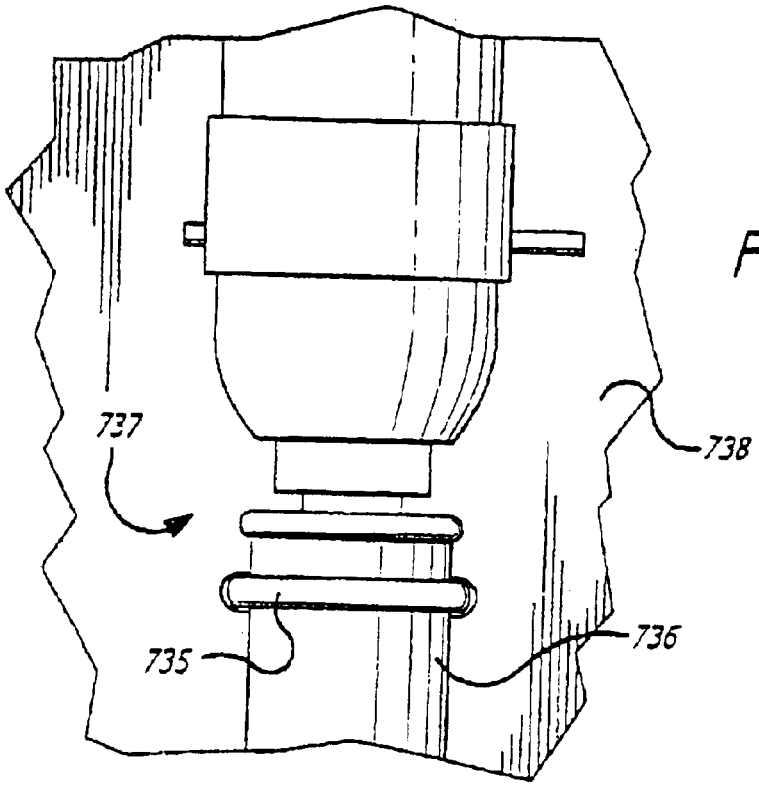
FIG. 28
FIG. 29
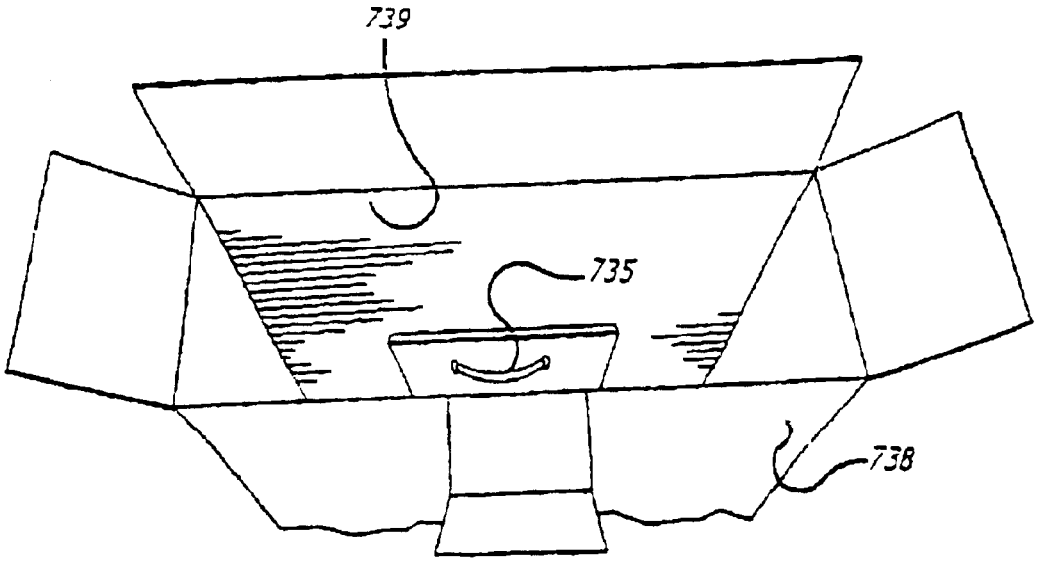

FREESTANDING PORTABLE LAMP DISPLAY PACKAGE

Matter enclosed in heavy brackets [ ] appears in the original patent but forms no part of this reissue specification; matter printed in italics indicates the additions made by reissue.

This is a divisional of Ser. No. 09/814,906 filed Mar. 22, 2001 now U.S. Pat. No. 6,325,209.

BACKGROUND OF THE INVENTION

1. Field of the Invention

The invention relates to package design, more particularly to a freestanding portable table lamp package for product display.

2. General Background and State of the Art

Current packaging methods for portable table lamps include completely enclosing the lamp within a cardboard box, enclosing the lamp partially in a box, often referred to as a "window box," or completely eliminating the box and simply placing the lamp loosely on the shelf.

Portable lamps packaged for retail sale in a completely enclosed box or "window box" generally have some type of photograph or descriptive text representing the item within. Portable lamps are either packaged with a shade chosen by the manufacturer or without a shade, allowing the customer to choose their own.

There are several inherent problems with these traditional methods of packaging. First, by completely enclosing the portable table lamp in a box, the customer is unable to fully view the true color or finish and shape of the lamp and must rely solely on the accuracy of the photo and accompanying text to describe the item. Many customers find this objectionable and therefore open the box and remove the lamp to get a positive view of the lamp. This often results in damaging the product, losing parts, etc., or making the item unfit for sale should they choose not to purchase the item.

Additionally, if the shade is sold separately, it is very difficult for the customer to visualize the complete lamp because the top (socket and neck) and bottom (base) are covered. This is generally due to the extra packaging material necessary to protect the lamp base during shipping.

More importantly, it is virtually impossible for the customer to select a properly sized shade for the table lamp without removing the lamp from the box and "trying on" several shades. This is critical, not only for the aesthetics of the table lamp, but the safety of the unit as a whole. An improperly sized shade (i.e., smaller than safely allowed by U.L. standards) can cause the shade to overheat and catch fire.

Secondly, typical window box types of packaging also have the same problems as an enclosed box package when trying to select an appropriate shade. While this type of packaging does make visible much of the lamp, giving the customer a more accurate description of most of the lamp, it still covers much of the neck and socket which makes it difficult to select an appropriate shade. Additionally, this type of packaging does not allow the customer to view the full side profile of the table lamp and, in some cases, the base of the lamp. This is particularly important with table lamps of an irregular shape.

Enclosed boxes and window boxes are constructed the way they are in order to pass "drop test" requirements by retail establishments in an effort to protect the lamp during shipping. Due to the extra cardboard, Styrofoam or other packaging materials necessary to accomplish this, the end result is a large box that takes up a lot of valuable shelf space, makes it difficult for the customer to carry and transport the box due Lo its bulkiness, and requires the customer to dispose of the excess packaging materials which contributes to the environmental problems of wasted resources and crowded landfills.

Thirdly, portable lamps placed loosely on a shelf are far more susceptible to damage. They are easily tipped over, resulting in broken bases, sockets, bent harps, etc. Cords are often tangled with other lamps which adds to the confusion. Lamps packaged using this method are often in disarray and do not present themselves well to the customer because they do hot have flat sides making them difficult to line up on the shelf and keep organized.

There is a need for a type of packaging that will allow the customer to see the entire lamp from one view angle without damaging the product or losing elements of the product while opening the package, that will allow the customer to effectively try on various shades, protect the lamp from damage during shipping and while on the shelf, and present the product well in an organized fashion to the customer.

INVENTION SUMMARY

It is an object of this invention to provide a freestanding portable lamp package for product display.

It is further the object of this invention to provide such a package which displays a fully or partially assembled product therein allowing the customer to examine the product without damage to the same or to the packaging.

It is another object of this invention to provide a freestanding portable lamp package for product display on a shelf wherein a plurality of lamps may be spaced and lined up on the shelf along with the tray the lamp is mounted in.

It is a further object of this invention to carry out the foregoing object by providing the packages containing the lamps with square sides that can abut against each other.

It is another object of this invention to carry out the foregoing objects wherein the package protects the product disposed therein from damage during shipping and display.

It is also an object of this invention to make the packaging more convenient for the customer to purchase and transport the packaging, as well as disposed of the packaging materials with minimum impact on landfills.

It is another object of this invention to allow the customer to select a shade, if the shade is sold separately, that will be visually acceptable to the customer while meeting basic safety standards.

These and other objects are preferably accomplished by providing a freestanding portable lamp package for product display. The packaging can be placed on a store shelf or the like. The package is freestanding and protects the product contained therein from damage during shipment and display and prevents the need for an individual to remove the product from such packaging and disturb the contents within, while displaying the product to the public. The package utilizes a minimum of packaging materials. The package features a handle on the back side to make it easy for the customer to carry the product and package.

It can be seen that there is disclosed a freestanding portable lamp display package that allows a customer to view completely the true color or finish and shape of the packaged table lamp. The customer can view the side profile of the table lamp. This is of particular importance where the lamp is irregularly shaped.

BRIEF DESCRIPTION OF THE DRAWINGS

FIG. 2 is a perspective view of a foldable mounting structure to be used with the fixture and base of FIG. 1;

FIG. 4 is a perspective view illustrating the fixture and base of FIG. 1 mounted in the packaging FIGS. 2 and 3;

FIG. 11 is an elevational view of a conventional lamp socket having a socket protector mounted thereon;

FIG. 12 is an elevational view of the socket protector alone of FIG. 11 removed from the lamp;

FIG. 13 is a detailed view of a modification of the top of the packaging shown in FIG. 6;

FIG. 22 is an exploded view of the packaging of the unit of FIGS. 20 and 21;

FIG. 23 is a perspective view of another embodiment of a lamp and packaging in accordance with the teachings of the invention;

FIG. 28 is an elevational view of a portion of a lamp and packaging therefor illustrating one type of tie of the lamp to the package; and FIG. 29 is a top view of the package of FIG. 28 open to show the back side of the tie of FIG. 28.

DETAILED DESCRIPTION OF THE PREFERRED EMBODIMENTS

Figure 1:
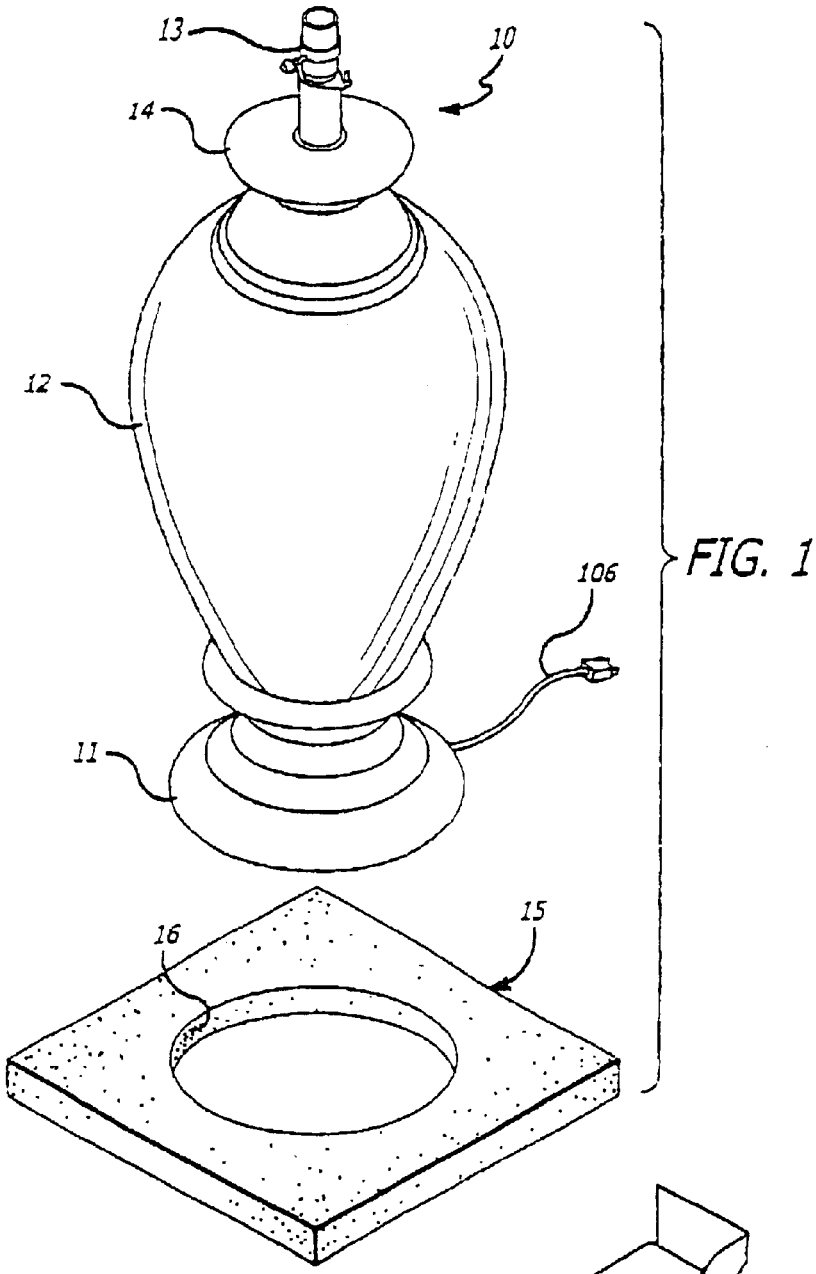
FIG. 1 is an exploded view of a fixture and a mounting base for the same.

Referring now to FIG. 1 of the drawing, a conventional table lamp 10 is shown having a base 11, a main body portion 12 and a light socket 13 at top. A collar 14 may be disposed between the socket 13 and body portion 12. As seen in FIG. 1, a mounting base 15 of any suitable material, such as Styrofoam, cardboard, etc. is provided being generally planar and rectangular with a central opening 16 configured to the outer periphery of base 11. As indicated by arrow 17, base 11 may be mounted within opening 16 providing a flat support for lamp 10.

As seen in FIG. 2, a support 18 of any suitable material, such as cardboard, is provided being of an elongated planar configuration having a first top flap 19 along fold line 20 to a second flap 21 extending generally normal to flap 19 forming a top wall. Flap 21 is connected to a vertical back panel 22 at fold line 23 and back panel 22 is connected to a panel 25, at fold line 24, extending normal to panel 22 forming a bottom wall. A front panel 26 is connected to bottom wall 25 at fold line 27 which panel 26 is folded back on top of panel 25 in assembly, as will be discussed. A plurality of slits 100 may be provided in panels 25 and 26, slits 100 in panel 26 being aligned with slits 100 in panel 25 when folded thereon for reasons to be discussed.

Figure 3:
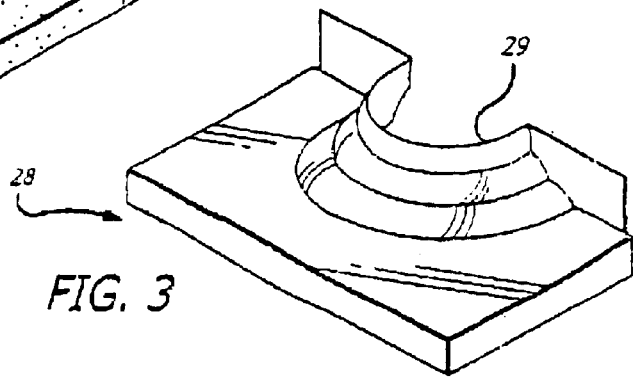
FIG. 3 is a perspective view of a blister base cover for covering the base of FIG. 1.

As seen in FIG. 3, a blister 28 of a transparent plastic material may be provided having a slotted opening for insertion onto base 15 of FIG. 1. That is, base 15, with base 11 of lamp 10 inserted thereon, is received within the blister 28 and arcuate cutout portion 29 surrounds the upper portion of base 11 of lamp 10 as seen in FIG. 4. Also as seen in FIG. 4, if lamp 10 has a harp 30 (see also FIG. 2) associated therewith, the harp 30 may be placed flat against back wall 22 with the free ends 31, 32 extending through openings 33 (FIG. 4) in tabs 34 punched or cut out of back wall 22 and folded along fold lines 35.

Figure 5:
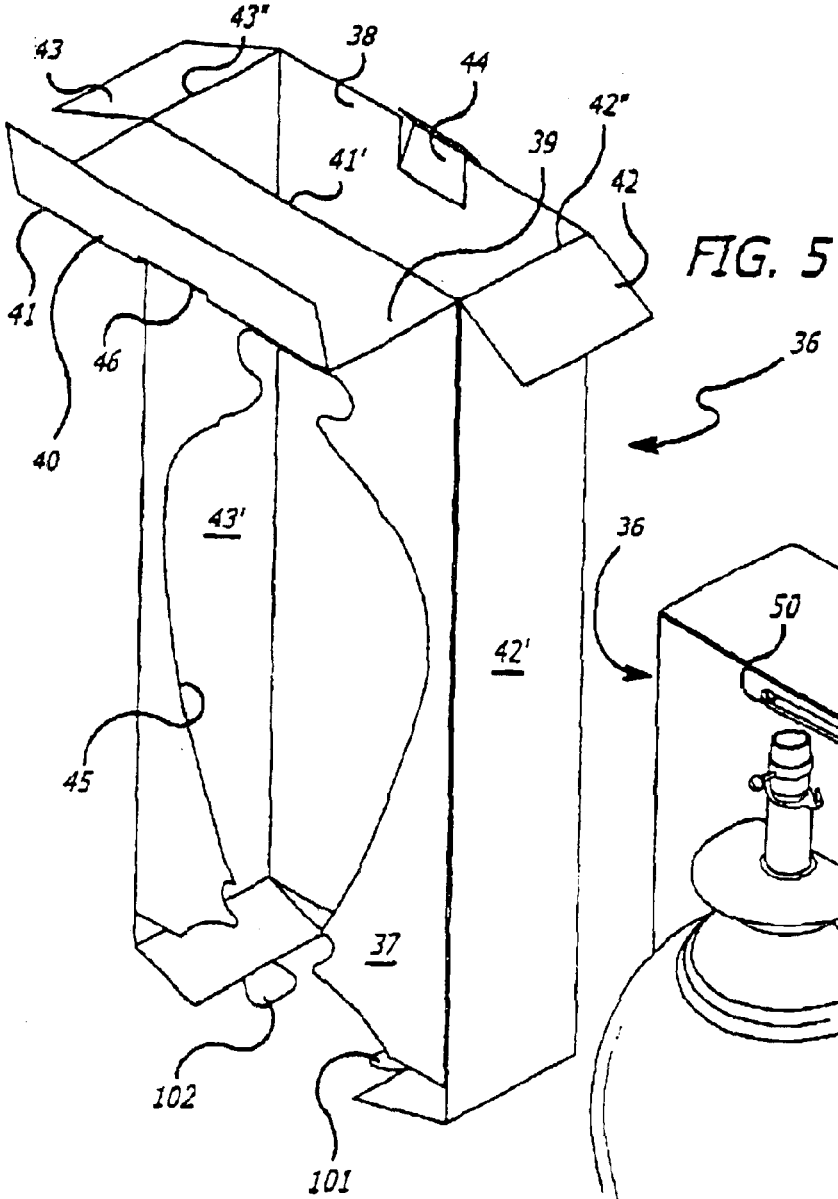
FIG. 5 is a perspective view of a box to be used to enclose the assembly of FIG. 4.
Figure 6:
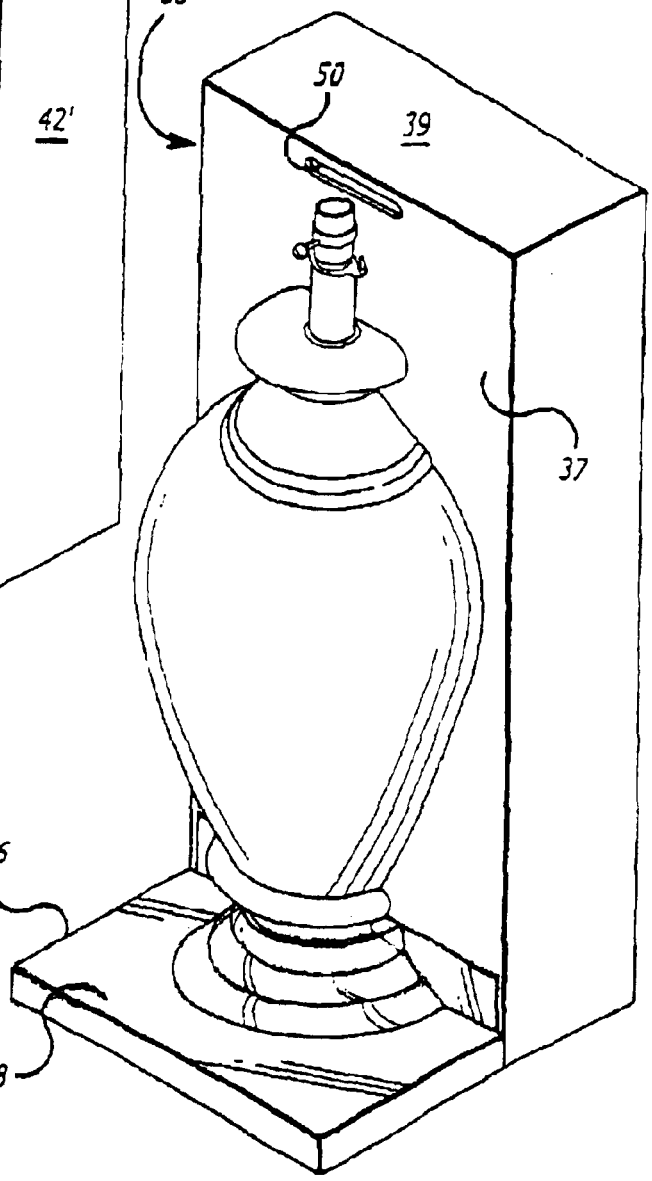
FIG. 6 is a perspective view of the assembly of FIG. 4 mounted in the box of FIG. 5.

As seen in FIG. 5, a box 36, with suitable indicia thereon, if desired, may be provided having a front wall 37, a rear wall 38, and a cutout portion 45 in front wall 37 configured similarly to fixture 10. Box 36 also has a top hinged flap 39, with a front fold tab 40 hinged thereto at fold line 41. Flap 39 is hinged to front wall 36 at fold line 41'. Right and left side flaps 42, 43, respectively, are hinged to side walls 42', 43', respectively, along fold lines 42", 43", respectively. A hinged cutout locking tab 44 is hinged to back wall 38. As seen in FIG. 6, fixture 10 is inserted into box 35 with the bottom blister 26 extending out beyond front wall 37 with fixture 10 disposed within cutout portion 45 and extending thereout. Side flaps 42, 43 are folded inwardly and top flap 49 is folded over side flaps 42, 43 with front folded flap 40 extending downwardly against the inside of rear wall 38. Locking flap 44 is then locked into a slot 46 (FIG. 5) at the intersection of top flap 49 and flap 40 along the fold line 41 thereof. Tabs 101, 102 (FIG. 5) lock into aligned slits 100 in flaps 25, 26 (FIG. 2).

The final assembly is shown in FIG. 6. The fixture 10 is packaged in a manner in which it is freestanding on a shelf or the like. One or more of the packaged fixtures can be placed side by side in a carton for shipping. Obviously, fixture 10 may be of any suitable outer configuration, the cutout area 45 of front panel 37 (FIG. 5) being configured similarly.

Figure 7:
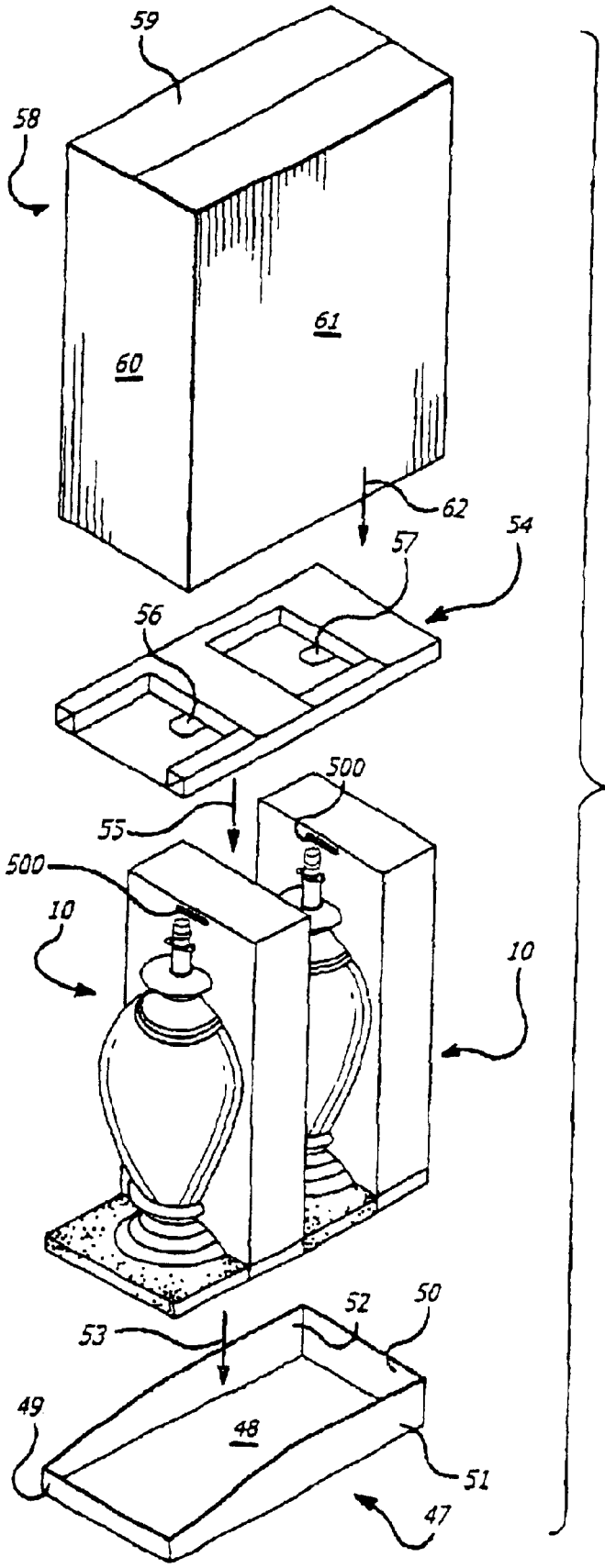
FIG. 7 is an exploded view of a shipping assembly for two of the fixtures of FIGS. 1 to 6.

This is shown in FIG. 7 wherein a base 47, which may be of cardboard or the like, is shown having a generally rectangular bottom planar wall 48, a front upstanding wall 49, a rear upstanding wall 50, and right and left side walls 51, 52, respectively, interconnecting front and rear walls 49, 50, forming a peripheral wall for base 47. Wall 50 may be higher than wall 49 as shown, and side walls 51, 52 may taper downwardly toward front wall 49 as shown.

A pair of fixtures 10, mounted as in FIG. 6, are placed within base 47 as indicated by arrow 53. A partition 54 may be provided which is placed over the tops of the two fixtures 10, as indicated by arrow 55, and has a pair of cutout areas 56, 57, that block the sockets of the two lamps when placed downwardly on top thereof as indicated by arrow 55. A carton 58, having a top wall 59, front and rear walls 60 (only front wall 60 visible in FIG. 7), and side walls 61 (only side wall 61 visible in FIG. 7) is provided, open at the bottom, which is placed over partition 54, the two fixtures 10 and base 47, as indicated by arrow 62, forming a shipping package for two of the fixtures of FIGS. 1 to 6. A die cut slot 500 may be provided in wall 37 for easy transport of the packaged lamp.

Figure 8:
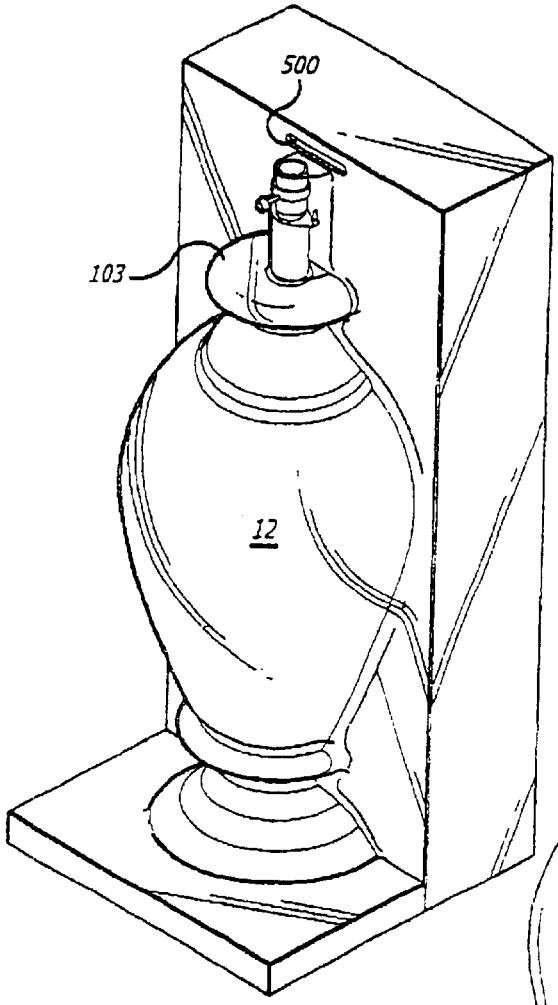
FIG. 8 is a view similar to FIG. 6 eliminating the blister of FIG. 3 and showing the assembly totally wrapped in a blister.

Although two such fixtures are shown in FIG. 7, obviously three or more may be packaged in like manner. Also, various pieces of cardboard, styrofoam, or other suitable materials may be inserted inside of box 58 around or between the lamps for cushioning purposes. Also, although a blister 28 is used to hold flaps 25, 26 in place and encircle and protect base 11, blister 28 may be eliminated and the entire assembly of FIG. 6, without blister 28, may be wrapped in a protective blister 103, as seen in FIG. 8, conforming to the outer configuration of fixture 12.

Figure 9:
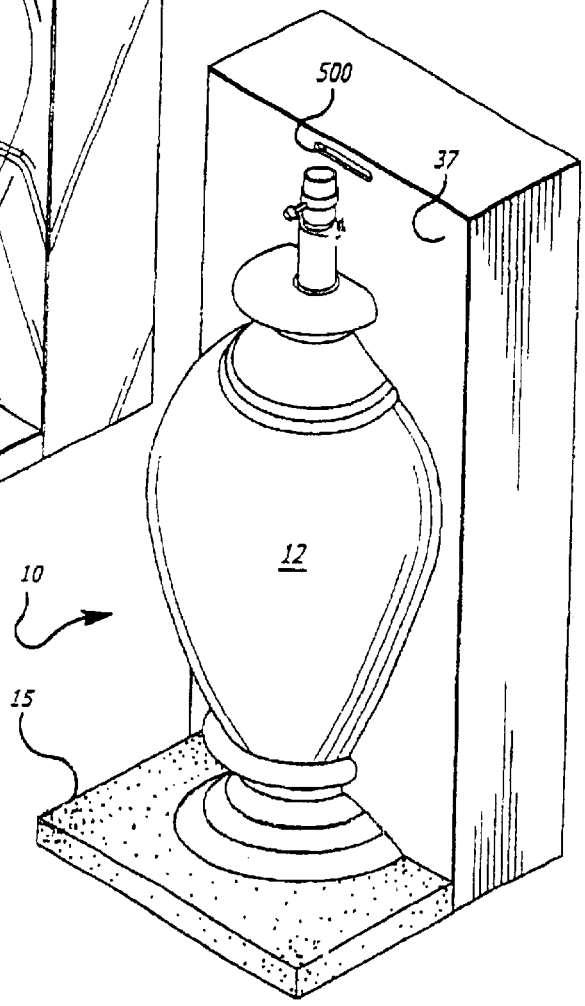
FIG. 9 is a view similar to FIG. 6 eliminating the blister of FIG. 3.

Blister 28 may be eliminated, as discussed above, and the assembly of FIG. 6, without blister 28, may be packaged as in FIG. 7 without any blister at all. This is shown in FIG. 9.

Figure 10:
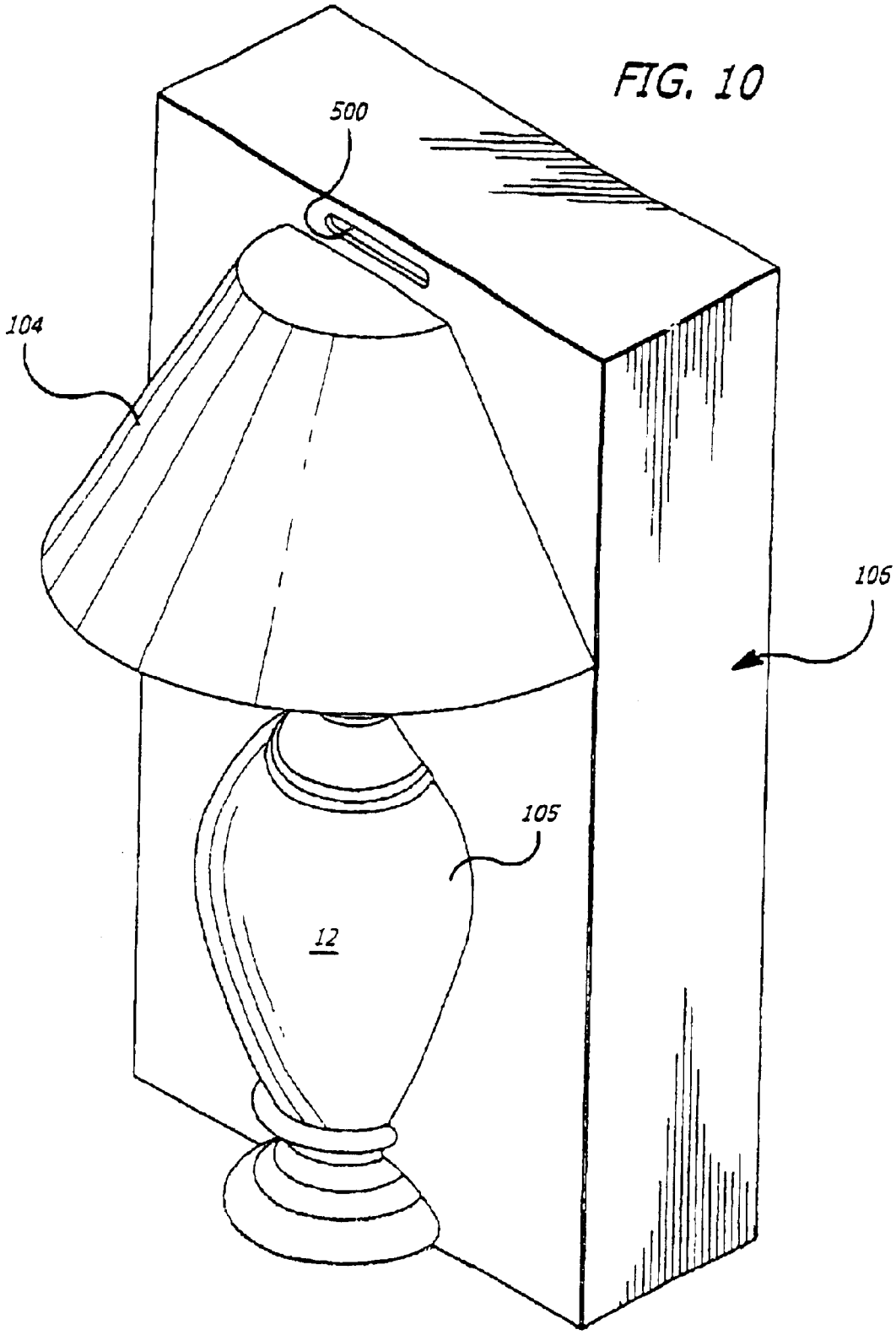
FIG. 10 is a view similar to FIG. 6 showing a shade mounted on the fixture of FIG. 6.

Although fixture 10 is shown without a shade, one may be provided as shown in FIG. 10. Thus, shade 104 may extend out of cutout portion 105 in box 106 (otherwise identical to box 36) as shown. The package of FIG. 10 may or may not include blister 28 and may or may not be encased in a full blister as in FIG. 8. The electric cord 106 (FIG. 1) of fixture 10 may be hidden inside of or under the base 15.

The customer can see the lamp in contour and thus does not have to rely solely on the manufacturer's representation of the table lamp as described on the box by a photograph or verbiage. The customer does not have to remove the table lamp from the packaging to obtain a positive view, which often results in damaging the product or the packaging, rendering it non-saleable or non-usable.

Figure 14:
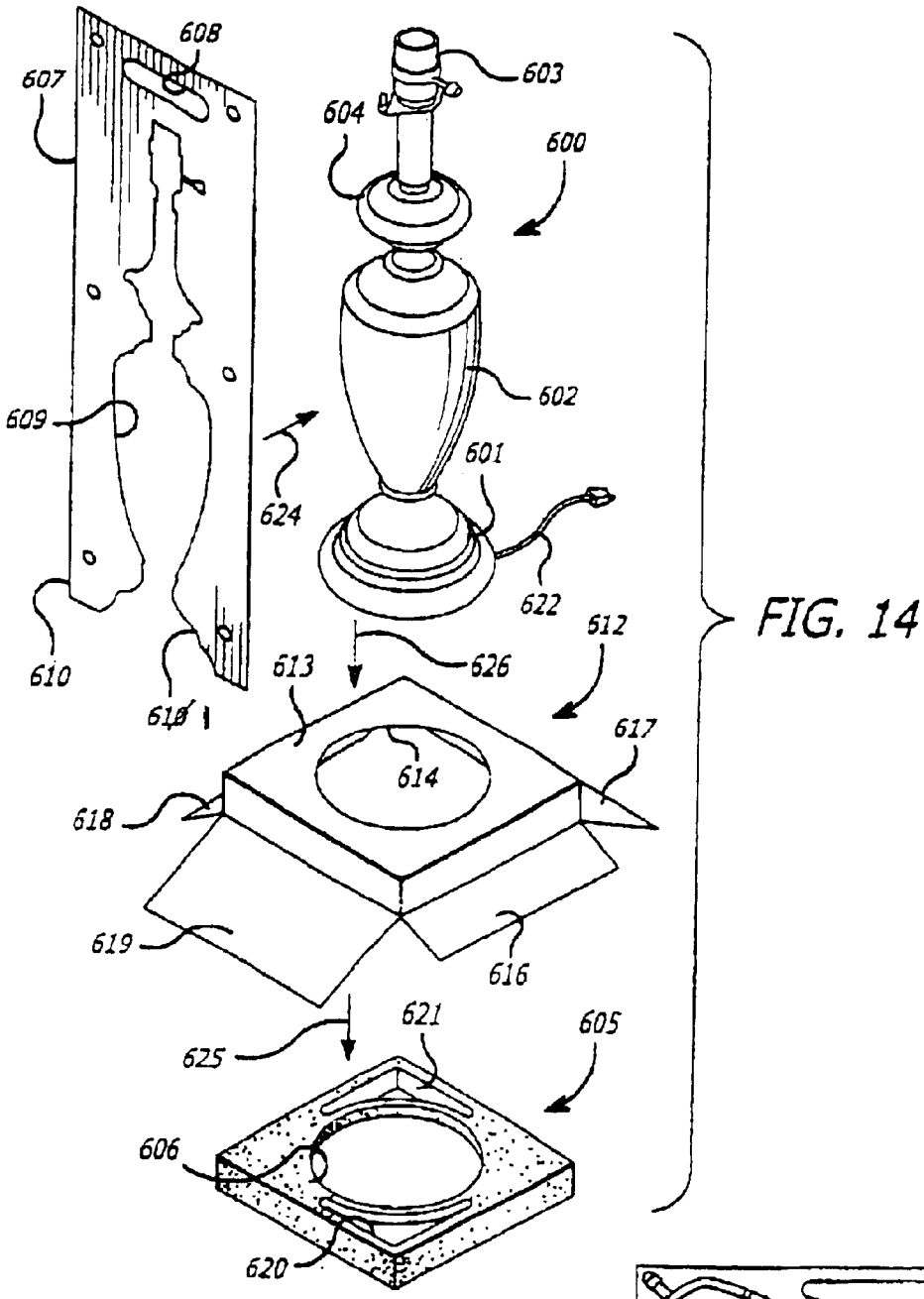
FIG. 14 is an exploded view of a different lamp and mounting therefor.

Referring now to FIG. 14 of the drawing, a conventional table lamp 600 is shown having a base 601, a main body portion 602 and a light socket 603 at top. A collar 604 may be disposed between the socket 603 and body portion 602. Mounting base 605, of any suitable material such as styrofoam, cardboard, etc., is provided being generally planar and rectangular with a central opening 606 configured to the outer periphery of base 601.

A planar support panel 607, which may be of cardboard or plastic or the like, is provided having a die cut slot 608 at top and a cut-out portion 609 configured to lamp 600. The bottom of panel 607, forming the bottom ends 610, 611 of panel 607, may be tapered to fit around base 601, as will be discussed. A box 612, which may be of cardboard or plastic, is provided having a top planar panel 613 with a central opening 614 and four foldable side panels 617 through 619 which fold about base 605.

Figure 15:
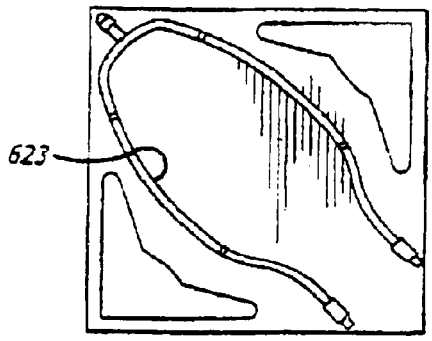
FIG. 15 is a plan view of the underside of one of the components of FIG. 14.

As seen in FIG. 14, base 605 may have a pair of spaced triangular slots 620, 621 on each side of opening 606. As seen in FIG. 15, these slots 620, 621 extend through base 605, which may be of styrofoam, and provide holes for lamp wire and plug 622 (FIG. 1) of lamp 600. A lamp harp 623, FIG. 15, may be mounted in the underside of base 605.

As indicated by the arrows 624 through 626 in FIG. 14, panel 607 is mounted onto lamp 600 as indicated by arrow 624. Box 612 is folded about base 605 as indicated by arrow 625. Lamp base 601 is mounted in aligned openings 614, 606 as indicated by arrow 626.

Figure 16:
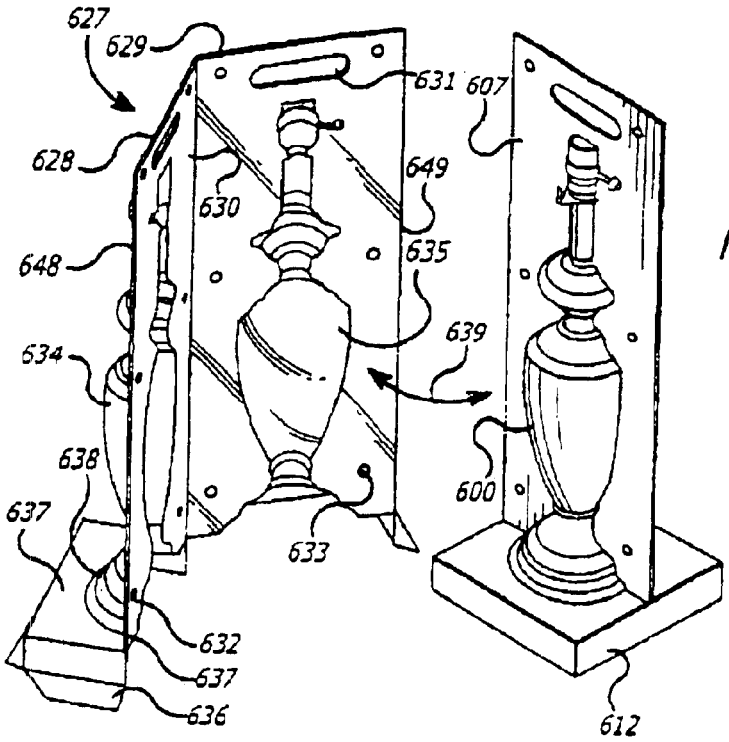
FIG. 16 is an exploded view of a blister and lamp to be mounted therein.

A clamshell blister 627, FIG. 16, which may be of plastic, is provided having a pair of panels 628, 629 hinged along fold line 630. A die cut slot 631 is provided at the top of each panel. A plurality of mating snaps 632, 633 may be provided on the respective panels 628, 629, respectively, so the panels snap fit together.

Each panel 628, 629 has a concave blistered portion 634, 635, respectively, contoured to the outer periphery of lamp 600 and about one-half the thickness thereof in depth. Each panel 628, 629 terminates at its bottom in a blistered base portion 636 having a box-like configuration for receiving one-half of base 612 therein as will be discussed. The upper wall 637 of base portion 636 has a convex blister section 638 conforming to the base of lamp 600.

Lamp 600, mounted in panel 607, and to box 612 and base 605, as discussed with respect to FIG. 14, is received within the contoured blister portions 634, 635 of blister 627 as indicated by arrow 639. Box 612 enters the base portion 636 of each panel 628, 629.

Figure 17:
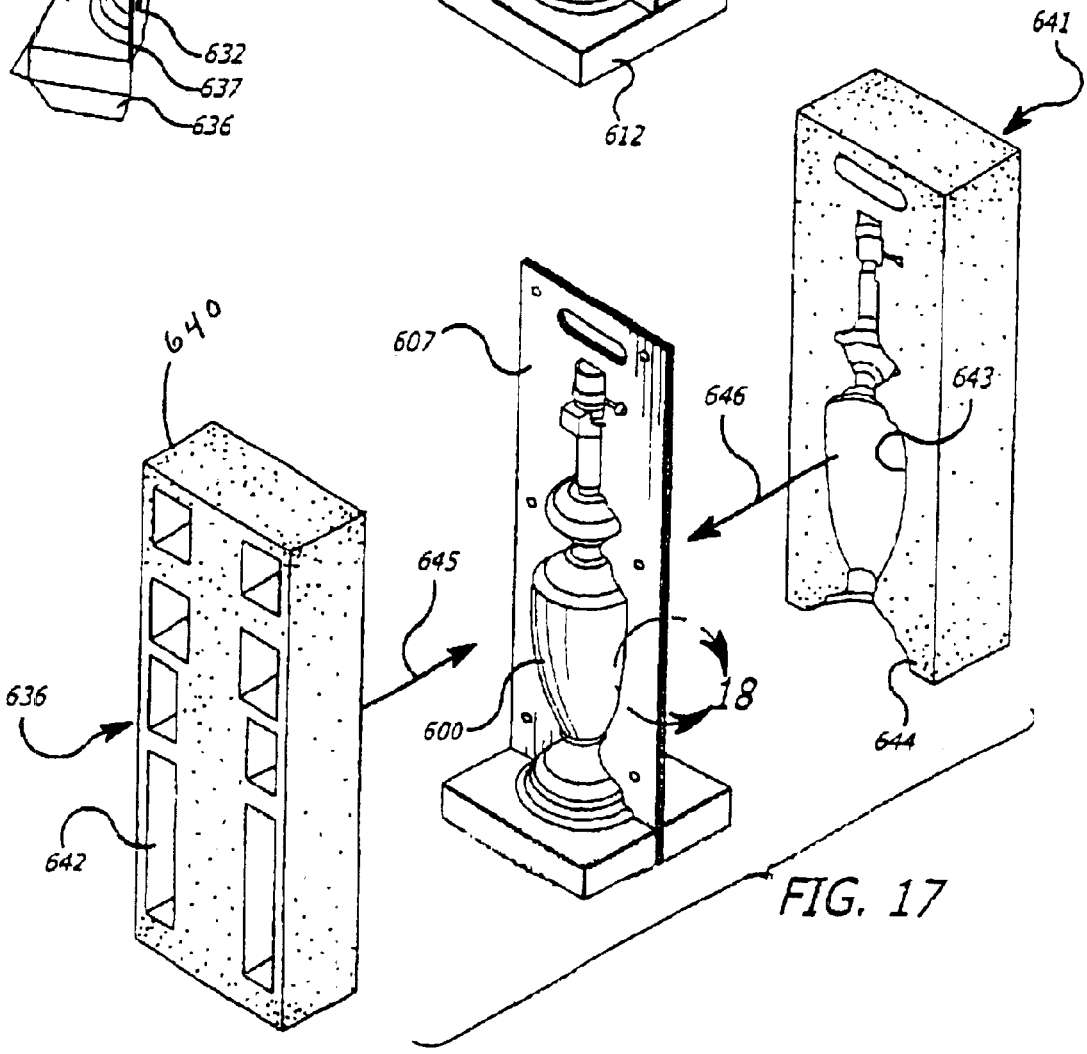
FIG. 17 is an exploded view of the assembly of the lamp and blister of FIG. 16 between a pair of packaging units.
Figure 18:
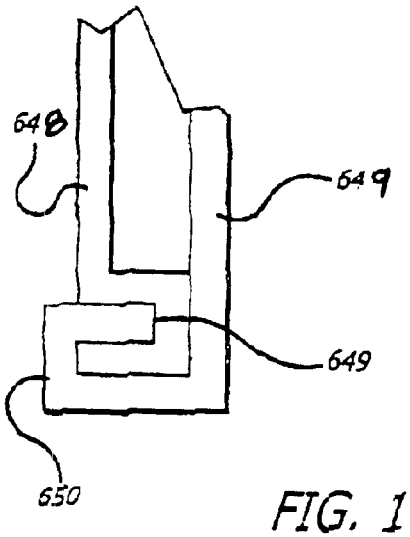
FIG. 18 is a detailed view taken along line 18—18 of FIG. 17.

The assembly of lamp 600 to a shipping package is shown in FIG. 17. A pair of rectangular shipping box portions 640, 641 are provided as tall as panels 628, 629 and as wide as box 612. These box portions may be of styrofoam and each has a plurality of cut-out areas 642 to reduce weight and product. Each portion 640, 641 has a concave contoured area 643 configured to lamp 600. The bottom 644 of each portion 640, 641 is undercut to fit about and conform to the upper area of base 601 of lamp 600. Thus, box portions 640, 641, as indicated by arrows 645, 646. are mounted together sandwiching lamp 600 and panel 607 therebetween with bottoms 644 resting on top of box 612. The edges 648, 649 of panels 628, 629, respectively, FIG. 16, have mating channel sections 649, 650 (see FIG. 18) that snap together.

Figure 19:
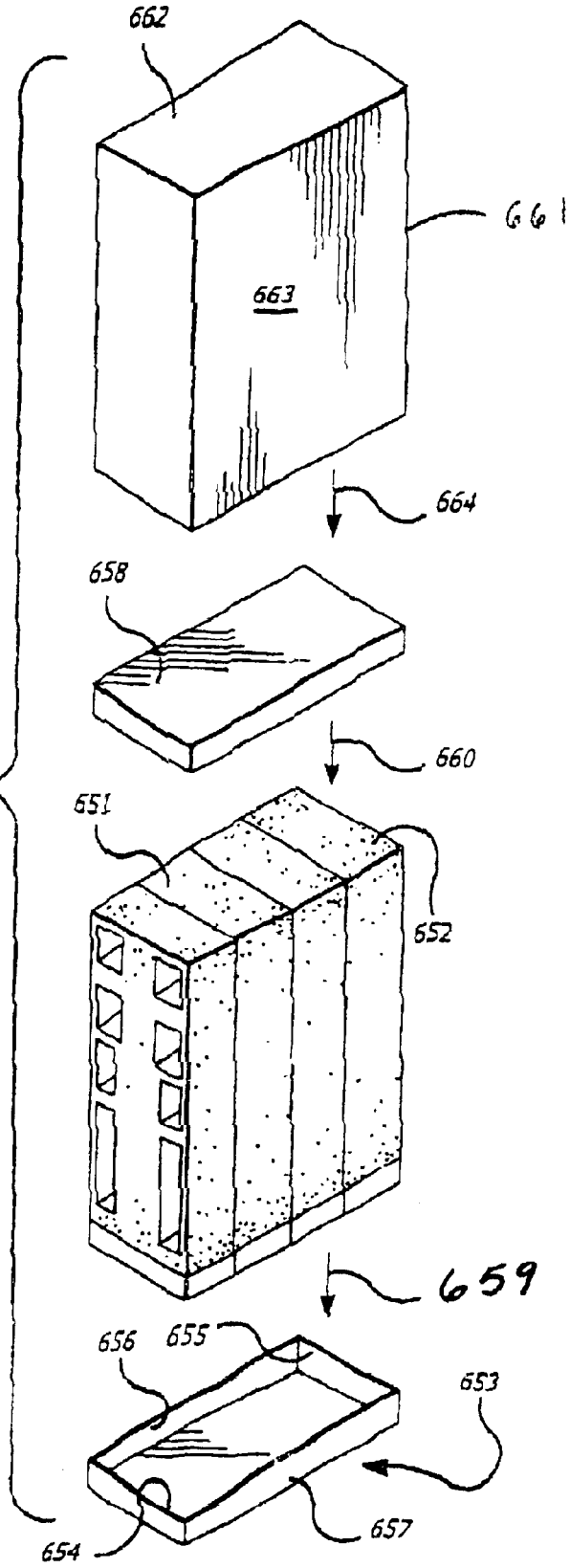
FIG. 19 is an exploded view of the packaging of two of the units of FIGS. 14 to 18.

As seen in FIG. 19, two lamp units 651, 652, packaged as heretofore discussed, may be disposed in a generally rectangular shipping tray 653, as indicated by arrow 659, having a front wall 654, a back wall 655, higher than wall 654, and tapered side walls 656, 657.

A packaging insert 658, which may be rectangular and of cardboard or styrofoam, conforming to the width and length of units 651, 652, is mounted on the top of units 651, 652, as indicated by arrow 660. Finally, a shipping box 661, open at bottom and closed at top by top wall 662, and having interconnected side walls 663, is mounted over insert 658 and units 651, 652, as indicated by arrow 664, enclosing tray 653. Of course, suitable packing tape may be used.

Figure 20:
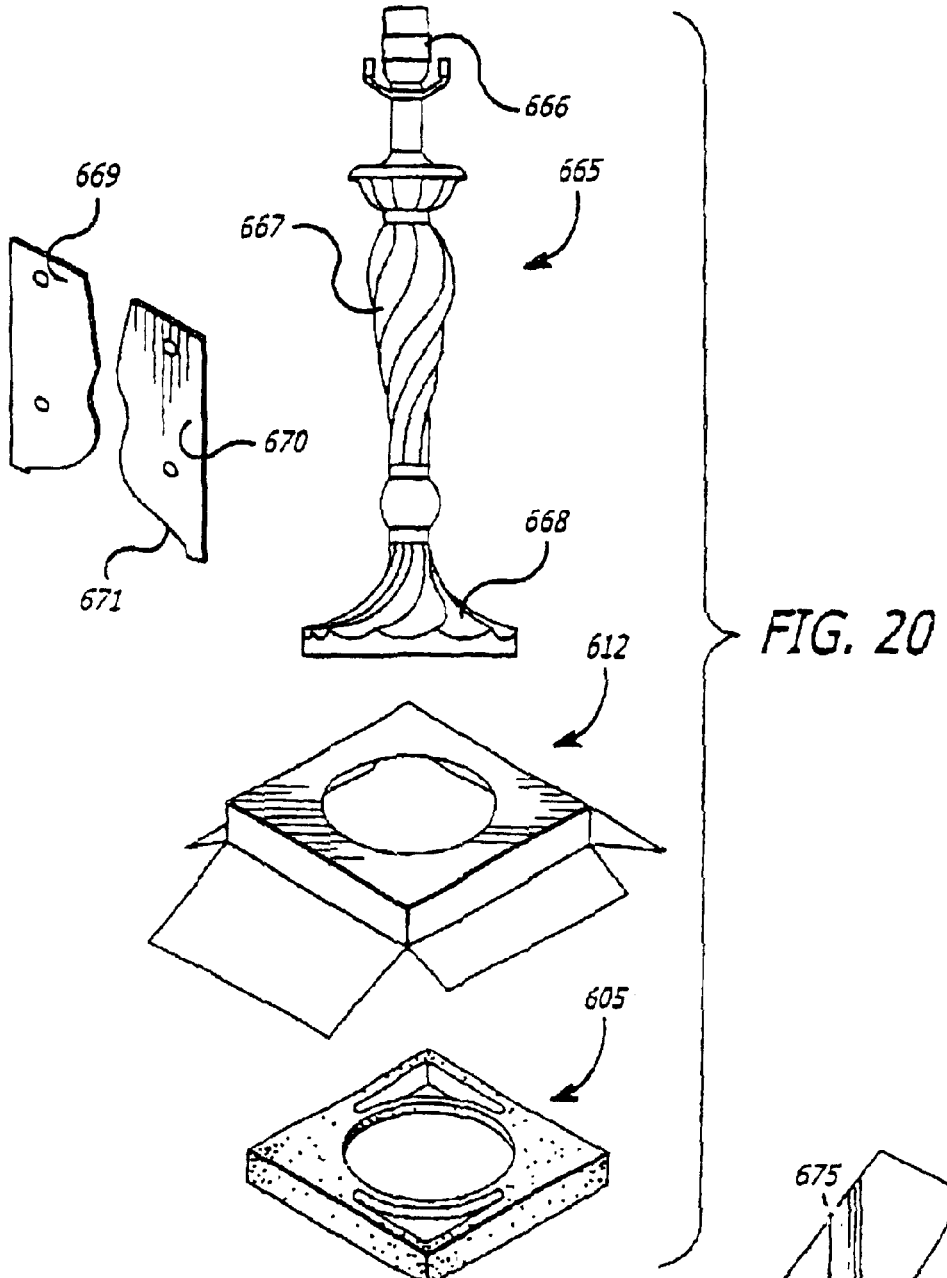
FIG. 20 is an exploded view similar to FIG. 14 showing another type of packaging.

Another variation is shown in FIG. 20. Here, lamp 665, having a socket 666, a main body portion 667, and a base 668, is mounted to base 605 and to box 612. Base 605 and box 612 are identical to box 612 and base 605 heretofore discussed. However, in this embodiment, panel 607 is replaced by a pair of panels 669, 670, each generally rectangular, and each having a bottom wall 671 conforming to base 668.

Figure 21:
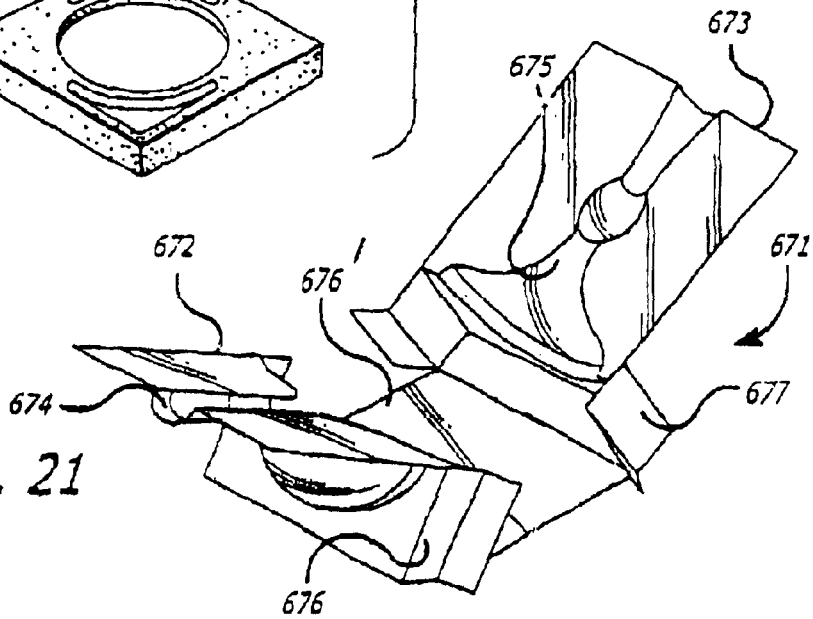
FIG. 21 is a perspective view of a blister for packaging the unit of FIG. 20.

Blister 671 (FIG. 21) differs from blister 627 having a pair of hinged blister portions 672, 673, each having a contoured concave portion 674, 675, respectively, conforming to lamp 665, and each terminating at its lower end in a one-half box portion (portions 676, 677, respectively), each having a common interconnecting panel 676', which, when brought together, form a box enclosing box 612 with lamp 665 mounted thereon, as heretofore discussed with respect to FIG. 16. The final position of lamp 665, with blister 671 mounted thereto and encompassing panels 669, 670 therebetween, is shown in FIG. 22. Units 640 and 641 are identical to the like units of FIG. 17 except that contoured portion 678 conforms to lamp 665. The side edges of blister portions 672, 673 interlock as previously discussed with respect to FIG. 18. The packaged lamp of FIGS. 21 and 22 may be packaged along with another unit as heretofore discussed with respect to FIG. 19.

Figure 24:
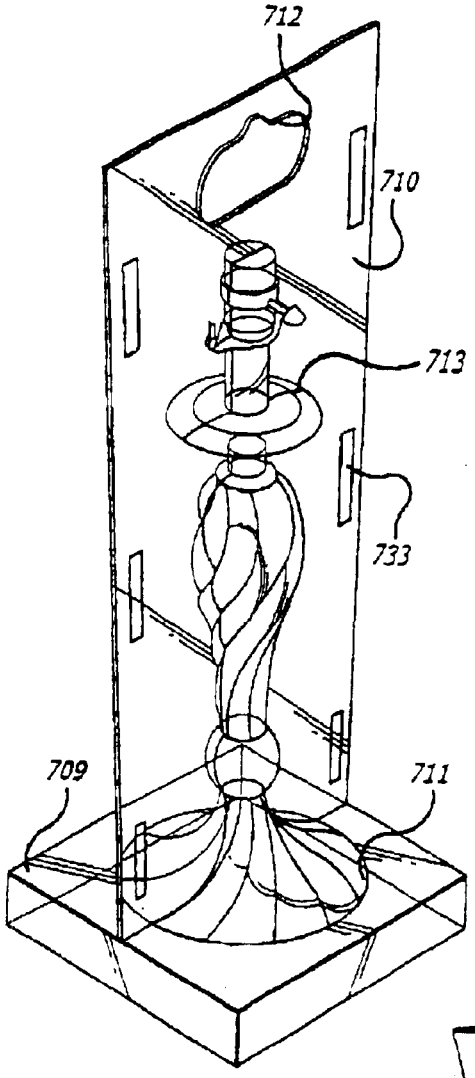
FIG. 24 is a perspective view of the packaging alone of FIG. 23.

As seen in FIG. 23, a lamp 700 having a socket 701, a main body portion 702, a collar 703, and a base 704 may be mounted in a box 705 (similar to aforementioned box 612) having an opening 706 therein. Base 704 fits into the box 705 protruding through opening 706. A blister package 707 is provided having a first upright front panel section 708 terminating in one-half of a box portion 709 at bottom (see FIG. 24). Package 707 also has a second upright rear panel section 710 also terminating at bottom in one-half of a box portion 711. A slot 712 is formed at the top of each section 708, 710 for carrying the package. Each section 708, 710 has a contoured mid-portion 713 configured to one-half of the lamp 700. Thus, the lamp 700 is mounted and packaged between the mating contoured portions 713.

Figure 25:
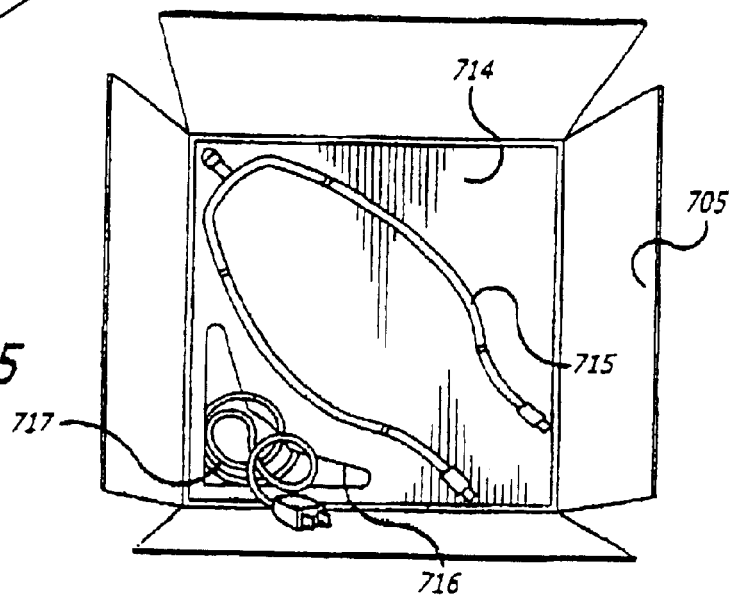
FIG. 25 is a bottom plan view of the inside of the box base of the packaging of FIGS. 23 and 24, the box panels open to show the partition panel therein.

As seen in FIG. 25, the underside of box 705 may have a panel 714 with a harp 715 mounted thereon, the panel 714 having a slot 716 receiving the plug and cord 717 of lamp 700 therethrough.

Figure 26:
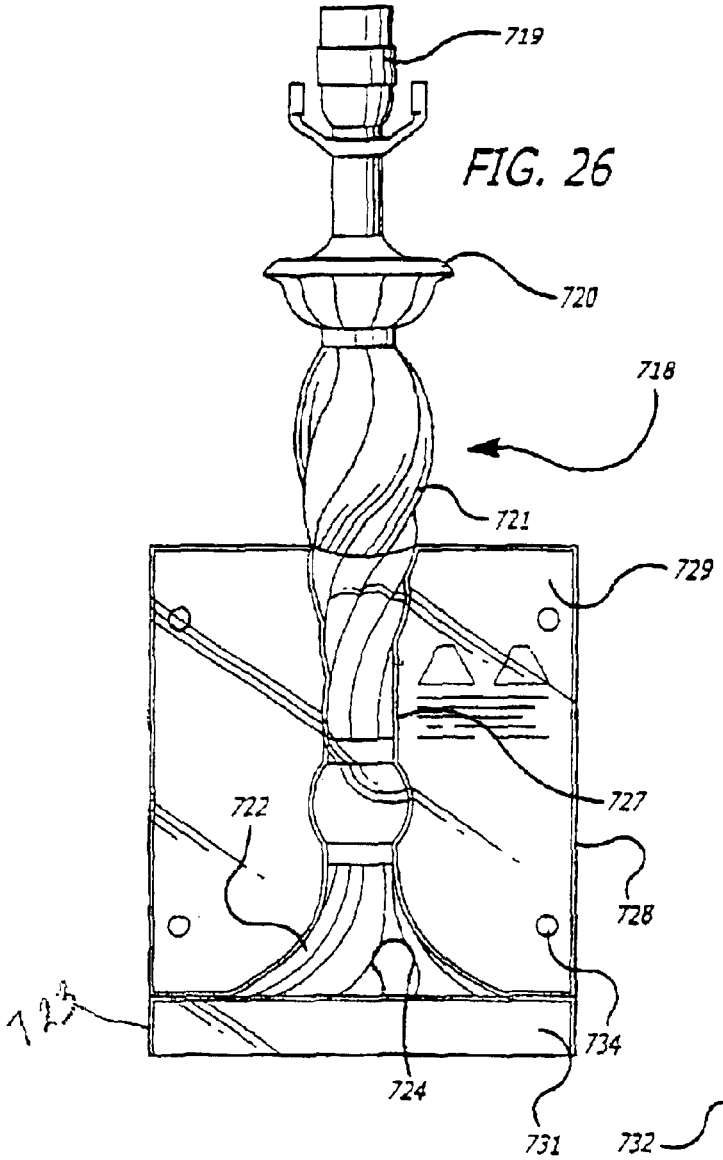
FIG. 26 is a front elevational view of still another embodiment of a lamp and packaging in accordance with the teachings of the invention.
Figure 27:
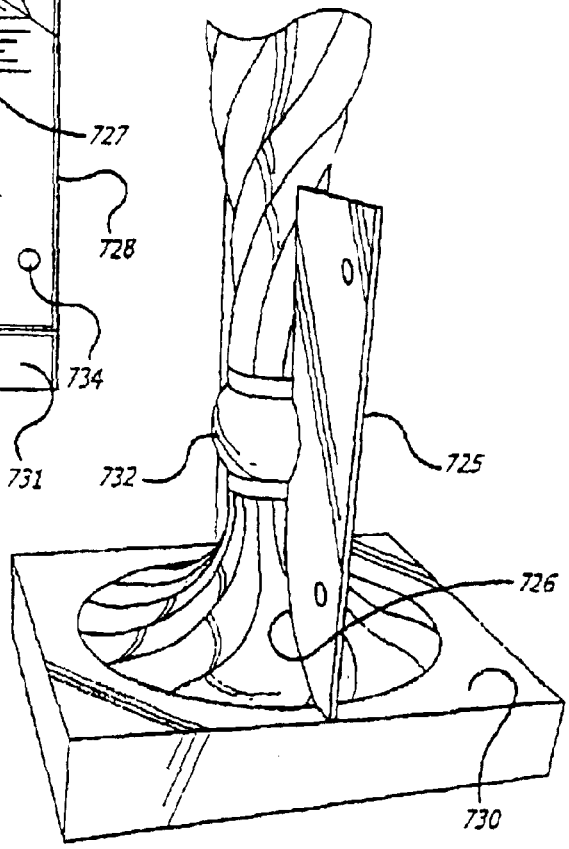
FIG. 27 is a side elevational view of the lamp and packaging of FIG. 26.

As seen in FIG. 26, lamp 718 is provided also having a socket 719, a collar 720, a main body portion 721, and a base 722. A box 723, similar to box 705 having opening 724, is provided. A panel 725 extends upwardly from about the middle of box 723 (see FIG. 27). Panel 725 is configured at cutout area 726 to conform to the upper surface of base 722 and is also configured at area 727 (FIG. 26) to the outer configuration of lamp 718. It is noted that a blister package 728, similar to package 707, encompasses lamp 718 but extends upwardly only about one-half of the length of lamp 718. Thus, blister package 728 has a pair of upright back to back panels 729 enclosing lamp 718, each having a one-half bottom base portion 731 (FIG. 26) and a contoured portion 732 (FIG. 27) conforming to lamp 718 and enclosing base 722. In both the embodiments of FIGS. 25 and 27, mating snap portions 733 (FIG. 24) and 734 (FIG. 26) may be provided for snapping the panels together.

As seen in FIG. 28, a tie strap 735, which may be a plastic strip, may be used to secure the body portions 736 of lamp 737 to its packaging 738. As seen in FIG. 29, the strap 735 protrudes through the packaging panel 739 and its free ends interlock to lock the lamp 737 to package 738.

Although a particular type of lamp and packaging is shown in FIGS. 28 and 29, obviously such tie strap 735 may be used in any of the embodiments herein by securing the lamp to its respective package.

The packaging system disclosed herein safely harbors loose components, such as a harp, finial or cord, which can otherwise become disorganized, lost or tangled and cause damage to the product or neighboring products. The cord is placed toward the back of the lamp and is stored out of the way where it could otherwise become tangled or detract from the "presentation" of the lamp. If the shade is sold separately from the lamp base, this packaging system allows the customer to "try on" various shades in order to select an appropriate sized shade which is critical for aesthetics and safety reasons. This allows the customer to actually see the final product.

The package system disclosed herein makes it possible for a customer to tell what type of shade harp needs to be used. There are various types of shade harps—one type is known which fits around the socket; another type of harp which fits into a special bracket that is mounted below the socket (hence the importance of seeing the socket); and there is a clip-on harp which clips to the bulb when installed on the lamp.

The socket and the neck of the lamp rests against the cardboard insert which makes it possible for the customer to view the neck and socket of the table lamp, which is critical in sizing a shade.

The packaging system disclosed herein may utilize Styrofoam, cardboard, or other suitable material behind the neck and socket area to give additional protection to this area of the lamp.

The harp bracket on the fixture is placed parallel to the cardboard insert for aesthetic and protection purposes. The packaging system of the invention may utilized a removable, discardable, socket-protecting device made of metal, wire, plastic or other suitable material which is inserted into the harp bracket of the lamp as if it were a harp and which extends over the socket. The customer is able to view the base of the table lamp. This is particularly important for lamps with an irregular shape. The packaging system herein has a support in the front of the lamp base that does not completely cover or hide the lamp base, preferably of clear plastic (but can also be cardboard, Styrofoam, shrink-wrap or other suitable material) to hold the lamp in place in the package and to protect the lamp.

The packaging system of the invention may utilize a simple support made of cardboard, clear plastic, Styrofoam, shrink-wrap or other suitable material to hold the lamp base in place and to protect it from damage. It may also utilize a complete clear plastic blister, shrink-wrap or other suitable material, to completely cover the lamp base, or lamp base and shade, to hold it in place and protect it from damage.

Additionally, this packaging system may utilize a clear plastic blister, shrink-wrap or other suitable material, to completely or partially cover the lamp base, or lamp base and shade, to hold it in place and protect it from damage. This packaging system also has a cardboard insert, generally of rectangular shape, that fits behind the table lamp. The insert has recessed or partially recessed areas in it, generally following the silhouette of the lamp, which allows the fixture to safely nest into the insert approximately one-third of the way, giving it protection and providing a background to display the lamp against and allow for descriptive text while providing protection from damage. This insert has squared off sides for easy organization, upkeep on shelves versus loose lamps. This insert gives the lamp base more stability and prevents the lamp from falling over, which oftentimes damages the base, socket, harp assembly, etc., as seen with loose lamps. The insert has a perforated die cut slot 500 creating a handle for the customer to easily carry the lamp and package, unlike the oversized bulky boxes commonly used. If desired, instead of die cut slot 500 as seen in FIG. 6, a slot 501 may be provided in top wall 39, otherwise identical to wall 39, receiving a strap handle 502 through slot 501 for transporting the unit. Strap handle 502 may be secured to a panel secured to the underside of wall 39' as is known in the art.

The cardboard insert may have a single, double or more than double layer of cardboard or other suitable material under the lamp base to give it additional support. The lamp fixture may be tied or secured to the package insert by means of one or more plastic strip ties or other suitable materials.

The packaging system of the invention allows each lamp to be tray-packaged for faster stocking of two or more lamps with more than one item of the same table lamp and yet still be visible when viewed from the side profile, which is very beneficial in retail establishments where product is displayed at the end of an aisle. When a tray is empty, the person stocking the shelf simply needs to pull the back tray forward. This is helpful when a deep shelf is used so the person does not need to climb on the shelf or use a ladder to reach the products in the back.

The packaging system of the invention reduces the amount of shelf space necessary to display the table lamp, as much of the packaging materials normally included in the individual box in order to pass mandatory "drop tests" by retail establishments is removed and disposed of with the master shipping carton. The system of packaging herein utilizes removable Styrofoam or cardboard inserts between the lamps packaged in the master shipping which decreases the overall amount of cardboard necessary. These inserts may be discarded at the time the product is put on the shelf. The end result is a more saleable product in the store with less wasted shelf space and gives the customer a much smaller package to handle. When the customer buys the product, the packaging disclosed herein takes less room in the shopper's cart than traditional packaging, which allows the customer to continue shopping.

The lamp may have a socket protector 300 (see also FIG. 12) mounted to the socket base 301 (FIG. 11) protecting socket 302. A cylindrical socket protective sleeve 303, of cardboard or the like, may be disposed inside of socket 302. Protector 300 (FIG. 12) is generally U-shaped, having spaced elongated legs 304, 305 and a Bail portion 308 interconnecting the legs at top which legs 305, 304 respectively, snap into suitable brackets 306, 307, respectively (FIG. 11) of socket base 301 as is well known in the art. Thus, socket 302 is protected during shipment and sleeve 303 and protector 300 can be removed by the customer.

Additionally, the removable cardboard is generally recycled by retail establishments which reduces the impact on environmental landfills as opposed to simply being thrown away by the consumer.

Although a particular embodiment of the invention is disclosed, variations thereof may occur to an artisan and the scope of the invention should only be limited by the scope of the appended claims.

I claim:

1. A package assembly for a light fixture comprising:

a light fixture having a socket at top, a lamp base at bottom, and a contoured main body portion interconnecting the lamp base and the socket;

a mounting base having an opening contoured to the outer periphery of the lamp base receiving said lamp base therein;

a box encompassing said mounting base having an opening therethrough receiving the base of said lamp therein;

at least one panel encompassing said light fixture having a cut-out section conforming to the outer configuration of said light fixture, said light fixture mounted within said cutout section; and a blister having a pair of hinged blister portions, each of said blister portions having a concave contoured portion conforming to one half of the outer contour of said light fixture sandwiching said light fixture, said box and said mounting base therebetween.

2. The assembly of claim 1 wherein each of said blister portions has a bottom one-half box portion receiving said box therein.

3. The assembly of claim 2 wherein each box portion has an upper surface contoured to said lamp base.

4. The assembly of claim 1 wherein each of said blister portions has a bottom one-half box portion with an integral wall forming the bottom wall of said box portions receiving said box therein.

5. The assembly of claim 4 wherein each box portion has an upper surface contoured to said lamp base.

6. The assembly of claim 1 wherein a pair of panels are provided, each of said panels contoured to said lamp base.

7. The assembly of claim 1 wherein said light fixture has an electrical wire and plug and said mounting base has an opening through said mounting base for receiving said wire and plug therein.

8. The assembly of claim 7 wherein said mounting base has a lamp harp mounted on the underside thereof.

9. The assembly of claim 1 including a pair of packaging units, each of said units having a concave contoured portion contoured to about one-half of the outer configuration of said light fixture, said concave portions facing said light fixture and sandwiching said light fixture therebetween, said light fixture received within said concave contoured portions.

10. The assembly of claim 9 wherein at least two light fixtures are disposed side by side on a tray, and a shipping box is mounted over said light fixtures and said tray.

11. The assembly of claim 1 including a tie strap encircling a portion of the lamp and said package tying said lamp to said package.

12. A package assembly for a light fixture comprising:

a light fixture having a socket at top, a lamp base at bottom, and a contoured main body portion interconnecting the lamp base and the socket;

a mounting base having an opening contoured to the outer periphery of the lamp base receiving said lamp base therein;

a box encompassing said mounting base having an opening therethrough receiving the base of said lamp therein; and a blister having a pair of hinged blister portions, each of said blister portions having a concave contoured portion conforming to one-half of the outer contour of said light fixture sandwiching said light fixture, said box and said mounting base therebetween.

13. The assembly of claim 12 wherein each of said blister portions has a bottom one-half box portion receiving said box therein.

14. The assembly of claim 13 wherein each box portion has an upper surface contoured to said lamp base.

15. The assembly of claim 12 wherein said box has a panel therein having an upper and lower surface with a slot therethrough, said panel having a lamp harp mounted therein, said lamp having a plug and cord protruding through said slot into said box.

16. The assembly of claim 12 including a tie strap encircling a portion of the lamp and said package tying said lamp to said package.

17. A package assembly for a light fixture comprising:

a light fixture having a socket at top, a lamp base at bottom, and a contoured main body portion interconnecting the lamp base and the socket;

a mounting base having an opening contoured to the outer periphery of the lamp base receiving said lamp base therein;

a box encompassing said mounting base having an opening therethrough receiving the base of said lamp therein;

at least one panel having an upper surface encompassing said light fixture having a cutout section conforming to the outer configuration of said light fixture, said light fixture mounted within said cutout section, said panel extending partway up said lamp to said main body portion; and a blister having a pair of hinged blister portions, each of said blister portions extending up to the upper surface of said panel and having a concave contoured portion conforming to one-half of the outer contour of said light fixture sandwiching said light fixture, said box and said mounting base therebetween.

18. The assembly of claim 17 wherein each of said blister portions has a bottom one-half box portion receiving said box therein.

19. The assembly of claim 18 wherein each box portion has an upper surface contoured to said lamp base.

20. The assembly of claim 17 wherein said box has a panel therein having an upper and lower surface with a slot therethrough, said panel having a lamp harp mounted thereon, said lamp having a plug and cord protruding through said slot into said box.

21. The assembly of claim 17 including a tie strap encircling a portion of the lamp and said package tying said lamp to said package.

*22. A package assembly for a light fixture comprising:*

*a light fixture having a socket at top, a lamp base at bottom, and a main body portion interconnecting the lamp base and the socket;*

*a mounting base for supporting said lamp base; and*

*a blister conforming to said mounting base and to a portion of said lamp base.*

*23. The assembly of claim 22 wherein said blister conforms to said main body portion of said lamp.*

*24. The assembly of claim 22 wherein said light fixture has an electrical wire and a plug and said mounting base has an opening through said mounting base for receiving said wire and plug therein.*

* * * * *